United States Patent Office 2,706,190
Patented Apr. 12, 1955

2,706,190

SILICONE RESINS HAVING PHENYL AND METHYL GROUPS ATTACHED TO SILICON

Harold A. Clark, Midland, Mich., assignor to Dow Corning Corporation, Midland, Mich., a corporation of Michigan No Drawing. Application October 22, 1952,
Serial No. 316,313

5 Claims. (Cl. 260—46.5)

This invention relates to a silicone resin having distinctive electrical insulating properties and to laminates thereof.

The silicone resins of this invention consist essentially of hydrocarbon substituted siloxane copolymers having an average degree of substitution of 1.25 to 1.40 organo groups per silicone atom and containing 15 to 37.5 mol per cent monomethylsiloxane, 20 to 38 mol per cent methylphenylsiloxane, 25 to 45 mol per cent monophenylsiloxane, and 2 to 15 mol per cent diphenylsiloxane. In addition, this invention also relates to the above defined resin compositions that contain up to 15 mol per cent dimethylsiloxane in which case the methyl phenyl siloxane component is reduced in like amount (on a molar per cent basis).

Silicone resins are well known commercial products which are used for electrical insulation, paints and coatings. Their use in applications which require heat stable, oxidation resistant, moisture resistant, and high dielectric compositions has become widespread in the last decade. One of the major applications of the silicone resins has been for electrical insulation purposes particularly in the form of glass cloth-silicone resin laminates.

It is the object of this invention to prepare silicone resins eminently adaptable for use in glass laminates and having dielectric properties heretofore unrealized by all previously known silicone resins.

The above objects are accomplished by employing siloxane copolymers having the general formula

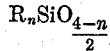

where R is methyl or phenyl and $n$ has an average value of 1.25 to 1.40, such copolymer being made up of 15 to 37.5 mol percent $CH_3SiO_{3/2}$ units, 20 to 38 mol per cent of $C_6H_5CH_3SiO$ units, 25 to 45 mol per cent $C_6H_5SiO_{3/2}$, and 2 to 15 mol per cent $(C_6H_5)_2SiO$ units. In addition, resins which contain, in lieu of 20 to 38 mol per cent $C_6H_5CH_3SiO$, 20 to 38 total mol per cent of $C_6H_5CH_3SiO$ and $(CH_3)_2SiO$ units, there being no more than 15 mol per cent $(CH_3)_2SiO$ units, and also within the scope of this invention. Thus, for example, if the resin contains 10 mol per cent dimethyl siloxane there must be from 10 to 28 mol per cent phenyl methyl siloxane present in the composition. In all cases, the ratio of the total number of monoorganosiloxane units to the total number of diorganosiloxane units in the copolymer is such that there is an average of from 1.25 to 1.40 organic groups per silicon atom.

The outstanding electrical properties of this invention cannot be obtanied employing silicone resins whose compositions fall outside the scope of this invention as defined above and in the claims. However, traces of other siloxanes such as, for example, monochlorophenylsiloxane and dixenylsiloxane may be included in the resin compositions of this invention.

The resins of this invention may be prepared either by cohydrolysis of the corresponding hydrolyzable silanes or by cocondensation of the corresponding siloxanes. Both of these are now conventional methods. The former is best carried out in the presence of solvents such as toluene or ether. The latter is preferably carried out both in the presence of a solvent, and in the presence of catalysts such as alkali metal hydroxides or salts of fatty acids.

If desired, the setting or curing of the resins may be hastened by any effective silicone resin catalyst. Among the effective catalysts which may be employed are, metallic chlorides such as antimony or ferric chloride, metal salts of organic acids such as lead naphthenate or cobalt 2-ethyl hexoate or potassium acetate, and quaternary ammonium compounds such as benzyl trimethyl ammonium butoxide or benzyldimethyl beta-hydroxyethyl ammonium 2-ethyl hexoate. Other catalysts which may be employed with the resins of this invention are voluminously disclosed in the patent literature.

The resins of this invention were tested by preparing glass cloth-resin laminates which were oven aged at 250° C. until the dielectric strength fell below 200 v./m. (volts per mil). Laminates of this nature are preferably prepared in a convenional manner by impregnating glass cloth by dipping or immersing in toluene (or xylene, benzene, etc.) solutions of the silicone resin, evaporating the solvent, and laminating the impregnated cloth under heat and pressure. Suitable impregnation may be accomplished employing solvent solutions containing usually 35–70% by weight resin (based on the total composition). The resin concentration of the solution employed may, of course, be varied to accommodate resins of various viscosities and/or to obtain any desired amount of resin pick-up in the cloth. Any effective mode of forming silicon resin laminates may be employed using the resins of this invention.

The following examples illustrate this invention without any implied limitation. This invention is limited only as set forth in the claims.

EXAMPLE 1

⅛ inch thick laminates of heat cleaned glass cloth ECC181 (manufactured by Owens Corning Fiberglass Company) impregnated and bonded by the following silicone resin compositions were prepared by molding at 240° C. under a pressure of 100–300 p. s. i. All laminates were prepared using identical number of impregnated glass cloth layers. The laminates were made employing the well known technique of dip impregnating glass cloth with toluene solutions of the resins (containing 55% by weight resin solids), air drying for 30 minutes and oven drying at 110° C. for 10 minutes to remove solvent, and finally laminating the solvent free impregnated glass cloth layers in a heated press.

Laminate A employed a silicone resin consisting of 65 mol per cent monomethylsiloxane and 35 mol per cent monophenylsiloxane, catalyzed with .033% by weight based on the resin) benzyl dimethyl beta-hydroxyethyl ammonium butoxide.

Laminate B was prepared from a silicone resin, consisting of 37 mol per cent monophenylsiloxane, 35 mol per cent monomethylsiloxane, and 28 mol per cent dimethylsiloxane, catalyzed with 0.1 per cent by weight (based on the resin), trimethyl beta-hydroxyethyl ammonium 2-ethyl hexoate.

Laminate C was prepared employing a resin consisting of 31.3 mol per cent monomethylsiloxane, 31.3 mol per cent monophenylsiloxane, 31.3 mol per cent phenylmethylsiloxane, and 6 mol per cent diphenylsiloxane. The resin used in laminate C was catalyzed with .02 per cent by weight (based on the resin weight) potassium added as the acetate.

Laminate D was prepared employing the resin of C catalyzed with .04 per cent by weight potassium added as the acetate and 0.1 per cent by weight zinc added as the 2-ethyl hexoate.

Laminate E likewise was prepared from the resin employed in laminate C but catalyzed with .05 per cent by weight benzyl dimethyl beta-hydroxyethyl ammonium butoxide.

Laminate F was prepared from the glass cloth supra and a silicone resin having the composition of 27.5 mol per cent monomethyl siloxane $CH_3SiO_{3/2}$, 35 mol per cent monophenylsiloxane, $C_6H_5SiO_{3/2}$, 25 mol per cent phenylmethylsiloxane $C_6H_5CH_3SiO$, 6 mol per cent diphenylsiloxane $(C_6H_5)_2SiO$, and 6.5 mol per cent dimethylsiloxane $(CH_3)_2SiO$. This resin was catalyzed with .04 per cent by weight potassium added as the acetate and 0.1 per cent by weight zinc added as the 2-ethyl hexoate. (Both based on the weight of the resin).

Laminate G was prepared from a resin having the composition of F, but from which the catalyst was removed by filtration prior to resin impregnating the glass cloth (preparatory to lamination).

EXAMPLE 2

The laminates prepared in Example 1 were tested for dielectric strength immediately after molding and then aged in a 250° C. oven. All laminates had an initial dielectric strength (ASTM D-149-47T using ¼ inch electrode, short time test), greater than 200 v./m. At regular intervals the laminates were removed from the 250° oven and rechecked for dielectric strength. When the dielectric strength fell below 200 v./m., the laminate was considered to have failed and oven ageing of that particular laminate was terminated. The results of testing are tabulated in Table 1 which follows. Column 2 of the table lists the per cent by weight resin based on the total weight of resin and glass cloth in the laminate. Column 3 of the table lists the number of hours of ageing at 250° C. required to lower the dielectric strength below 200 v./m.

*Table 1*

| Laminate | Percent Resin | Hours at 250° C. |
|---|---|---|
| A | 35 | 40 |
| B | 35 | 80 |
| C | 29 | >3,050 |
| D | 34 | >3,060 |
| E | 30 | >2,280 |
| F | 31 | >2,116 |
| G | 24 | >2,066 |

Laminates C, D, E, F, and G employed the resins of this invention. Laminates A and B employed previously known silicone resins and are included for comparison.

The great improvement in the resins of this invention in ability to maintain electrical properties unimpaired when subjected to prolonged high temperature is accomplished without any substantial sacrifice in other properties. For example, laminates C-G inclusive were characterized by room temperature flexural strengths as good or better than laminates A and B. The resins of this invention may be advantageously employed to bond mica, asbestos, and other heat stable siliceous dielectric materials to form parts having excellent dielectric properties.

That which is claimed is:

1. As a composition of matter a siloxane resin having the general formula $$R_nSiO_{\frac{4-n}{2}}$$

wherein R is a monovalent hydrocarbon radical selected from the group consisting of methyl and phenyl radicals and $n$ has an average value of 1.25 to 1.40 inclusive, said resin consisting essentially of 15 to 37.5 mol per cent $CH_3SiO_{3/2}$ units, 20 to 38 mol per cent of diorganosiloxane units selected from the group consisting of $(CH_3)_2SiO$ and $C_6H_5(CH_3)SiO$ units, there being no more than 15 mol per cent $(CH_3)_2SiO$ units, 25 to 45 mol per cent $C_6H_5SiO_{3/2}$ units and 2 to 15 mol per cent $(C_6H_5)_2SiO$ units.

2. As a composition of matter a siloxane resin having the general formula $$R_nSiO_{\frac{4-n}{2}}$$

wherein R is a radical selected from the group consisting of phenyl and methyl radicals and $n$ has an average value of 1.25 to 1.40 inclusive, said resin consisting essentially of 15 to 37.5 mol per cent $CH_3SiO_{3/2}$ units, 20 to 38 mol per cent $C_6H_5(CH_3)SiO$ units, 25 to 45 mol per cent $C_6H_5SiO_{3/2}$ units and 2 to 15 mol per cent $(C_6H_5)_2SiO$ units.

3. A composition of matter comprising (1) a siloxane resin having the general formula $$R_nSiO_{\frac{4-n}{2}}$$

wherein R is a monovalent hydrocarbon radical selected from the group consisting of methyl and phenyl radicals and $n$ has an average value of 1.25 to 1.40 inclusive, said resin consisting essentially of 15 to 37.5 mol per cent $CH_3SiO_{3/2}$ units, 20 to 38 mol per cent of diorganosiloxane units selected from the group consisting of $(CH_3)_2SiO$ and $C_6H_5(CH_3)SiO$ units there being no more than 15 mol per cent $(CH_3)_2SiO$ units, 25 to 45 mol per cent $C_6H_5SiO_{3/2}$ units, and 2 to 15 mol per cent $(C_6H_5)_2SiO$ units, and (2) a setting catalyst.

4. A composition in accordance with claim 3 wherein the catalyst is beta-hydroxyethyl-trimethyl ammonium 2-ethyl hexoate.

5. An article of manufacture comprising at least one layer of a siliceous material impregnated and bonded with a mixture of (1) a siloxane resin having the general formula $$R_nSiO_{\frac{4-n}{2}}$$

wherein R is a monovalent hydrocarbon radical selected from the group consisting of methyl and phenyl radicals and $n$ has an average value of 1.25 to 1.40 inclusive, said resin consisting essentially of 15 to 37.5 mol per cent $CH_3SiO_{3/2}$ units, 20 to 38 mol per cent of diorganosiloxane units selected from the group consisting of $(CH_3)_2SiO$ and $C_6H_5(CH_3)SiO$ units there being no more than 15 mol per cent $(CH_3)_2SiO$ units, 25 to 45 mol per cent $C_6H_5SiO_{3/2}$ units, and 2 to 15 mol per cent $(C_6H_5)_2SiO$ units, and (2) a setting catalyst.

References Cited in the file of this patent

UNITED STATES PATENTS

| | | |
|---|---|---|
| 2,258,222 | Rochow | Oct. 7, 1941 |
| 2,504,388 | Braley | Apr. 18, 1950 |
| 2,518,160 | Mathes | Aug. 8, 1950 |
| 2,622,072 | Gordon | Dec. 16, 1952 |